(12) United States Patent
Zones et al.

(10) Patent No.: US 7,138,097 B1
(45) Date of Patent: Nov. 21, 2006

(54) REDUCTION OF OXIDES OF NITROGEN IN A GAS STREAM USING MOLECULAR SIEVE SSZ-73

(75) Inventors: Stacey Zones, San Francisco, CA (US); Allen Burton, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 11/320,226

(22) Filed: Dec. 27, 2005

(51) Int. Cl.
*B01D 53/56* (2006.01)

(52) U.S. Cl. .............. 423/239.1; 423/239.2; 423/213.2; 423/213.5; 423/219

(58) Field of Classification Search ........... 423/335, 423/706, 718, 213.2, 213.5, 219, 239.1, 239.2
See application file for complete search history.

(56) References Cited

U.S. PATENT DOCUMENTS

| | | | | | |
|---|---|---|---|---|---|
| 3,012,853 | A | * | 12/1961 | Milton | 423/718 |
| 4,046,859 | A | * | 9/1977 | Plank et al. | 423/707 |
| 5,342,596 | A | * | 8/1994 | Barri et al. | 423/710 |

FOREIGN PATENT DOCUMENTS

JP     59083927 A * 5/1984

* cited by examiner

*Primary Examiner*—David Sample
(74) *Attorney, Agent, or Firm*—Richard J. Sheridan

(57) ABSTRACT

The present invention relates to new crystalline, essentially all silicon oxide molecular sieve SSZ-73 prepared using a 3-ethyl-1,3,8,8-tetramethyl-3-azoniabicyclo[3.2.1]octane cation as a structure-directing agent, and its use in the reduction of oxides of nitrogen in a gas stream such as the exhaust from an internal combustion engine.

6 Claims, No Drawings

REDUCTION OF OXIDES OF NITROGEN IN A GAS STREAM USING MOLECULAR SIEVE SSZ-73

BACKGROUND OF THE INVENTION

1. Field of the Invention

The present invention relates to new crystalline, essentially all silicon oxide molecular sieve SSZ-73, a method for preparing SSZ-73 using a 3-ethyl-1,3,8,8-tetramethyl-3-azoniabicyclo[3.2.1]octane cation as a structure directing agent ("SDA") and uses for SSZ-73.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new molecular sieves with desirable properties for gas separation and drying, hydrocarbon and chemical conversions, and other applications. New molecular sieves may contain novel internal pore architectures, providing enhanced selectivities in these processes.

SUMMARY OF THE INVENTION

The present invention is directed to a family of crystalline molecular sieves with unique properties, referred to herein as "molecular sieve SSZ-73" or simply "SSZ-73". SSZ-73 is obtained in its silicate form. The term "silicate" refers to a molecular sieve containing all silicon oxide or a very high mole ratio of silicon oxide to another oxide.

SSZ-73 is a crystalline molecular sieve comprising essentially all silicon oxide and having, after calcination, the X-ray diffraction lines of Table II. As used herein, "essentially all silicon oxide" or "essentially all-silica" means that the molecular sieve's crystal structure is comprised of only silicon oxide or is comprised of silicon oxide and only trace amounts of other oxides, such as aluminum oxide, which may be introduced as impurities in the source of silicon oxide.

In accordance with this invention, there is provided a process for the reduction of oxides of nitrogen contained in a gas stream wherein said process comprises contacting the gas stream with a crystalline molecular sieve comprising essentially all silicon oxide and having, after calcination, the X-ray diffraction lines of Table II. The molecular sieve may contain a metal or metal ions (such as cobalt, copper, platinum, iron, chromium, manganese, nickel, zinc, lanthanum, palladium, rhodium or mixtures thereof) capable of catalyzing the reduction of the oxides of nitrogen, and the process may be conducted in the presence of a stoichiometric excess of oxygen. In a preferred embodiment, the gas stream is the exhaust stream of an internal combustion engine.

DETAILED DESCRIPTION OF THE INVENTION

The present invention comprises a molecular sieve designated herein "molecular sieve SSZ-73" or simply "SSZ-73". It is believed SSZ-73 has a framework topology similar to that of the molecular sieve designated STA-6. That framework topology has been designated "SAS" by the IZA. However, STA-6 is a metallo aluminophosphate, whereas SSZ-73 is a silicon-containing molecular sieve.

SSZ-73 is unusual in that it is only one-dimensional with small pores, yet has a very large micropore volume due to its sizeable cages. SSZ-73 has a nitrogen micropore volume of 0.25 cc/gm. This is surprisingly high for a one-dimensional molecular sieve. SSZ-73 also has an unexpectedly high surface area of about 585 $m^2$/gm.

In preparing SSZ-73, a 3-ethyl-1,3,8,8-tetramethyl-3-azoniabicyclo[3.2.1]octane cation is used as a structure directing agent ("SDA"), also known as a crystallization template. The SDA useful for making SSZ-73 has the following structure:

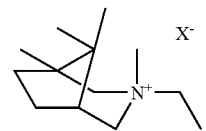

3-Ethyl-1,3,8,8-tetramethyl-3-azonia-bicyclo[3.2.1]octane

The SDA cation is associated with an anion ($X^-$) which may be any anion that is not detrimental to the formation of the SSZ-73. Representative anions include halogen, e.g., fluoride, chloride, bromide and iodide, hydroxide, acetate, sulfate, tetrafluoroborate, carboxylate, and the like. Hydroxide is the most preferred anion. The structure directing agent (SDA) may be used to provide hydroxide ion. Thus, it is beneficial to ion exchange, for example, a halide to hydroxide ion.

The 3-ethyl-1,3,8,8-tetramethyl-3-azonia-bicyclo[3.2.1] octane cation SDA can be prepared by a method similar to that described in U.S. Pat. No. 5,268,161, issued Dec. 7, 1993 to Nakagawa, which discloses a method for preparing 1,3,3,8,8-pentamethyl-3-azoniabicyclo[3.2.1]octane cation. U.S. Pat. No. 5,268,161 is incorporated by reference herein in its entirety.

In general, SSZ-73 is prepared by contacting an active source of silicon oxide with the 3-ethyl-1,3,8,8-tetramethyl-3-azoniabicyclo[3.2.1]octane cation SDA in the presence of fluoride ion.

SSZ-73 is prepared from a reaction mixture comprising silicon oxide and the following (expressed in terms of mole ratios):

TABLE A

| Reaction Mixture | | |
|---|---|---|
| | Typical | Preferred |
| $OH^-/SiO_2$ | 0.20–0.80 | 0.40–0.60 |
| $Q/SiO_2$ | 0.20–0.80 | 0.40–0.60 |
| $M_{2/n}/SiO_2$ | 0–0.04 | 0–0.025 |
| $H_2O/SiO_2$ | 2–10 | 3–7 |
| $HF/SiO_2$ | 0.20–0.80 | 0.30–0.60 | where M is an alkali metal cation, alkaline earth metal cation or mixtures thereof; n is the valence of M (i.e., 1 or 2); Q is a 3-ethyl-1,3,8,8-tetramethyl-3-azoniabicyclo[3.2.1]octane cation and F is fluoride.

A preferred active source of silicon oxide is tetraethyl orthosilicate.

If it is desired that SSZ-73 have catalytic activity, small amounts of a metal oxide, such as aluminum oxide, may be introduced into the framework of the SSZ-73. This can be done by adding an active source of, e.g., aluminum oxide into the reaction mixture, resulting in silicoaluminate having a $SiO_2/Al_2O_3$ mole ratio of about 400/1.

In practice, SSZ-73 is prepared by a process comprising:

(a) preparing an aqueous solution containing a source(s) of silicon oxide, a source of fluoride ion and a 3-ethyl-1,3,8,8-tetramethyl-3-azoniabicyclo[3.2.1]octane cation having an anionic counterion which is not detrimental to the formation of SSZ-73;

(b) maintaining the aqueous solution under conditions sufficient to form crystals of SSZ-73; and (c) recovering the crystals of SSZ-73.

The reaction mixture is maintained at an elevated temperature until the crystals of the SSZ-73 are formed. The hydrothermal crystallization is usually conducted under autogenous pressure, at a temperature between 100° C. and 200° C., preferably between 135° C. and 180° C. The crystallization period is typically greater than 1 day and preferably from about 3 days to about 20 days. The molecular sieve may be prepared using mild stirring or agitation.

During the hydrothermal crystallization step, the SSZ-73 crystals can be allowed to nucleate spontaneously from the reaction mixture. The use of SSZ-73 crystals as seed material can be advantageous in decreasing the time necessary for complete crystallization to occur. In addition, seeding can lead to an increased purity of the product obtained by promoting the nucleation and/or formation of SSZ-73 over any undesired phases. When used as seeds, SSZ-73 crystals are added in an amount between 0.1 and 10% of the weight of first tetravalent element oxide, e.g. silica, used in the reaction mixture.

Once the molecular sieve crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-73 crystals. The drying step can be performed at atmospheric pressure or under vacuum.

SSZ-73 as synthesized has the X-ray diffraction lines of Table I below. SSZ-73 has a framework topology comprising essentially all silicon oxide and has a composition, as synthesized (i.e., prior to removal of the SDA from the SSZ-73) and in the anhydrous state, comprising silicon oxide and, in terms of mole ratios, the following:

| | |
|---|---|
| $M_{2/n}/SiO_2$ | 0–0.03 |
| $Q/SiO_2$ | 0.02–0.08 |
| $F/SiO_2$ | 0.01–0.10 | wherein M is an alkali metal cation, alkaline earth metal cation or mixtures thereof; n is the valence of M (i.e., 1 or 2); Q is a 3-ethyl-1,3,8,8-tetramethyl-3-azoniabicyclo[3.2.1]octane cation and F is fluoride.

SSZ-73 is characterized by its X-ray diffraction pattern. SSZ-73, as-synthesized, has an X-ray powder diffraction pattern that exhibits the characteristic lines shown in Table I.

TABLE I

As-Synthesized SSZ-73

| 2 Theta[a] | d-spacing (Angstroms) | Relative Integrated Intensity (%)[b] |
|---|---|---|
| 8.94 | 9.88 | S |
| 10.67 | 8.28 | W |
| 16.58 | 5.34 | VS |
| 19.42 | 4.57 | M |
| 20.07 | 4.42 | VS |
| 21.41 | 4.15 | M |
| 25.47 | 3.49 | M |
| 27.69 | 3.22 | W-M |
| 30.89 | 2.89 | W |
| 33.51 | 2.67 | W-M |

[a]±0.1

[b]The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

W(weak) is less than 20; M(medium) is between 20 and 40; S(strong) is between 40 and 60; VS(very strong) is greater than 60.

Table IA below shows the X-ray powder diffraction lines for as-synthesized SSZ-73 including actual relative intensities.

TABLE IA

As-Synthesized SSZ-73

| 2 Theta[a] | d-spacing (Angstroms) | Intensity |
|---|---|---|
| 8.94 | 9.88 | 50.2 |
| 10.67 | 8.28 | 11.1 |
| 16.58 | 5.34 | 100.0 |
| 17.65 | 5.02 | 0.5 |
| 19.42 | 4.57 | 26.1 |
| 20.07 | 4.42 | 75.9 |
| 20.94 | 4.24 | 3.6 |
| 21.41 | 4.15 | 27.6 |
| 24.51 | 3.63 | 10.7 |
| 24.96 | 3.56 | 6.0 |
| 25.47 | 3.49 | 31.2 |
| 26.57 | 3.35 | 7.9 |
| 26.75 | 3.33 | 6.6 |
| 27.04 | 3.29 | 6.2 |
| 27.69 | 3.22 | 22.8 |
| 28.53 | 3.13 | 4.5 |
| 29.68 | 3.01 | 8.2 |
| 30.89 | 2.89 | 13.4 |
| 32.62 | 2.74 | 4.8 |
| 33.19 | 2.70 | 9.2 |
| 33.51 | 2.67 | 20.5 |
| 34.91 | 2.57 | 7.7 |
| 35.62 | 2.52 | 3.0 |
| 36.06 | 2.49 | 3.1 |
| 37.09 | 2.42 | 8.5 |
| 38.63 | 2.33 | 0.9 |
| 39.47 | 2.28 | 2.1 |
| 40.45 | 2.23 | 5.0 |
| 40.77 | 2.21 | 3.7 |

[a]±0.1

After calcination, the X-ray powder diffraction pattern for SSZ-73 exhibits the characteristic lines shown in Table II below.

TABLE II

Calcined SSZ-73

| 2 Theta[a] | d-spacing (Angstroms) | Relative Integrated Intensity (%) |
|---|---|---|
| 8.84 | 10.00 | VS |
| 10.69 | 8.27 | W |
| 12.53 | 7.06 | W |
| 16.50 | 5.37 | W |
| 19.54 | 4.54 | W |
| 19.88 | 4.46 | W |
| 21.49 | 4.13 | W |
| 25.23 | 3.53 | W |
| 27.48 | 3.24 | W |
| 33.38 | 2.68 | W |

[a] ±0.1

Table IIA below shows the X-ray powder diffraction lines for calcined SSZ-73 including actual relative intensities.

TABLE IIA

Calcined SSZ-73

| 2 Theta[a] | d-spacing (Angstroms) | Relative Integrated Intensity (%) |
|---|---|---|
| 8.84 | 10.00 | 100.0 |
| 10.69 | 8.27 | 9.8 |
| 12.53 | 7.06 | 5.1 |
| 16.50 | 5.37 | 13.1 |
| 17.75 | 4.99 | 1.1 |
| 19.54 | 4.54 | 4.9 |
| 19.88 | 4.46 | 13.1 |
| 20.79 | 4.27 | 1.1 |
| 21.49 | 4.13 | 4.4 |
| 24.35 | 3.65 | 1.5 |
| 24.96 | 3.56 | 0.7 |
| 25.23 | 3.53 | 7.9 |
| 26.54 | 3.36 | 1.0 |
| 26.79 | 3.33 | 1.8 |
| 26.99 | 3.30 | 0.6 |
| 27.48 | 3.24 | 4.2 |
| 28.27 | 3.15 | 1.4 |
| 30.81 | 2.90 | 2.3 |
| 32.32 | 2.77 | 0.7 |
| 32.34 | 2.77 | 0.4 |
| 32.91 | 2.72 | 2.5 |
| 33.38 | 2.68 | 3.6 |
| 34.96 | 2.56 | 0.1 |
| 35.21 | 2.55 | 0.5 |
| 35.36 | 2.54 | 0.3 |

[a] ±0.1

The X-ray powder diffraction patterns were determined by standard techniques. The radiation was the K-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

The variation in the scattering angle (two theta) measurements, due to instrument error and to differences between individual samples, is estimated at ±0.1 degrees.

Representative peaks from the X-ray diffraction pattern of calcined SSZ-73 are shown in Table II. Calcination can result in changes in the intensities of the peaks as compared to patterns of the "as-synthesized" material, as well as minor shifts in the diffraction pattern.

Crystalline SSZ-73 can be used as-synthesized, but preferably will be thermally treated (calcined). Usually, it is desirable to remove the alkali metal cation (if any) by ion exchange and replace it with hydrogen, ammonium, or any desired metal ion.

SSZ-73 can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the SSZ-73 can be extruded before drying, or, dried or partially dried and then extruded.

SSZ-73 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

SSZ-73 may be used for the catalytic reduction of the oxides of nitrogen in a gas stream. Typically, the gas stream also contains oxygen, often a stoichiometric excess thereof. Also, the molecular sieve may contain a metal or metal ions within or on it which are capable of catalyzing the reduction of the nitrogen oxides. Examples of such metals or metal ions include cobalt, copper, platinum, iron, chromium, manganese, nickel, zinc, lanthanum, palladium, rhodium and mixtures thereof.

One example of such a process for the catalytic reduction of oxides of nitrogen in the presence of a zeolite is disclosed in U.S. Pat. No. 4,297,328, issued Oct. 27, 1981 to Ritscher et al., which is incorporated by reference herein. There, the catalytic process is the combustion of carbon monoxide and hydrocarbons and the catalytic reduction of the oxides of nitrogen contained in a gas stream, such as the exhaust gas from an internal combustion engine. The zeolite used is metal ion-exchanged, doped or loaded sufficiently so as to provide an effective amount of catalytic copper metal or copper ions within or on the zeolite. In addition, the process is conducted in an excess of oxidant, e.g., oxygen.

EXAMPLES

The following examples demonstrate but do not limit the present invention.

Example 1

Synthesis of SSZ-73

To a Teflon cup for a 23 ml Parr stainless steel reactor, 5 millimoles of 3-ethyl-1,3,8,8-tetramethyl-3-azoniabicyclo [3.2.1]octane hydroxide SDA and 2.10 grams of tetraethyl orthosilicate were added. The aqueous solution of the SDA in its hydroxide form will hydrolyze the orthosilicate ester. The mix of the two reactants was left in a hood without a top to allow the ethanol and water (for the most part) to evaporate over 5–7 days until the internal contents appeared to be dry. The reactor (which had been tared) was re-weighed and a small amount of water was added back in to adjust the $H_2O/SiO_2$ mole ratio to 3.5. Then, 0.20 grams of 48–52% HF was added drop wise and the contents were mixed with a plastic spatula. A thick gel set up. The reactor was closed and heated for 9 days at 150° C. and 43 RPM. The reactor was removed from the oven, cooled to room temperature and a sample was taken for Scanning Electron Microscopy. No crystals were seen, so the reaction was run in series of 6 day increments until a product was seen at 27 days. The contents of the reactor were then collected in a fritted filter with copious water washing. After drying, the crystalline product was found, by x-ray diffraction, to be SSZ-73. Subsequent runs can have their reaction time about halved by adding seed material.

Example 2

Calcination of SSZ-73

The material from Example 1 was calcined in the following manner. A thin bed of material was heated in a muffle furnace from room temperature to 120° C. at a rate of 1° C. per minute and held at 120° C. for three hours. The temperature is then ramped up to 540° C. at the same rate and held at this temperature for five hours, after which it was increased to 594° C. and held there for another five hours. A 50/50 mixture of air and nitrogen was passed over the SSZ-73 at a rate of 20 standard cubic feet (0.57 standard cubic meters) per minute during heating.

What is claimed is:

1. A process for the reduction of oxides of nitrogen contained in a gas stream wherein said process comprises contacting the gas stream with a crystalline molecular sieve comprising essentially all silicon oxide and having, after calcination, the X-ray diffraction lines of Table II.

2. The process of claim 1 conducted in the presence of oxygen.

3. The process of claim 1 wherein said molecular sieve contains a metal or metal ions capable of catalyzing the reduction of the oxides of nitrogen.

4. The process of claim 3 wherein the metal is cobalt, copper, platinum, iron, chromium, manganese, nickel, zinc, lanthanum, palladium, rhodium or mixtures thereof.

5. The process of claim 1 wherein the gas stream is the exhaust stream of an internal combustion engine.

6. The process of claim 4 wherein the gas stream is the exhaust stream of an internal combustion engine.

* * * * *